INVENTOR
Guy Maes
BY
Kenyon, Palmer, Stewart + Estabrook
ATTORNEYS

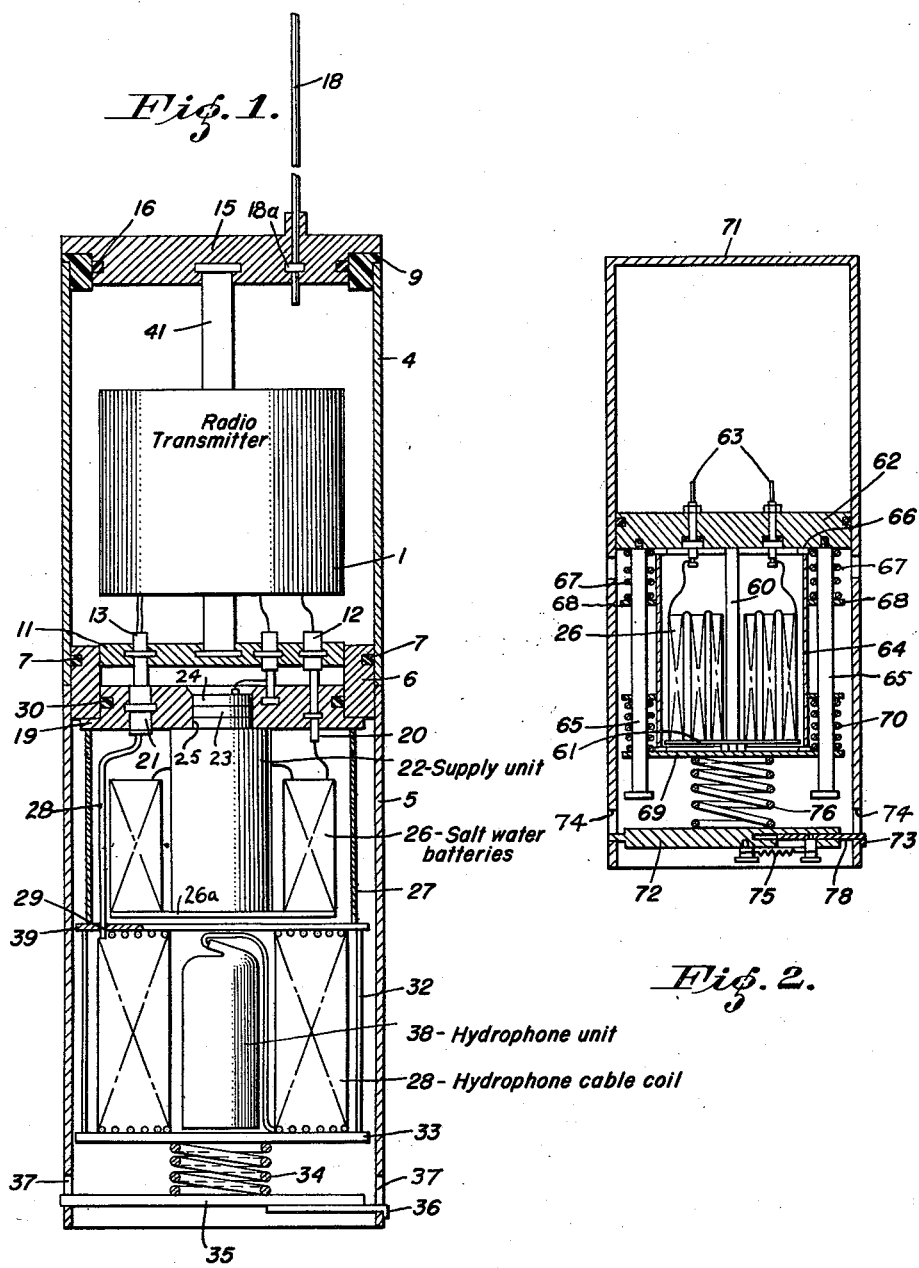

INVENTOR
Guy Maes

May 5, 1964   G. MAES   3,132,322
RADIOSONIC BUOYS
Filed Feb. 8, 1960   4 Sheets-Sheet 4
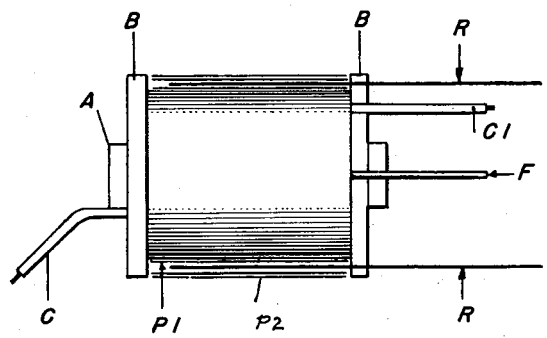
Fig. 10.
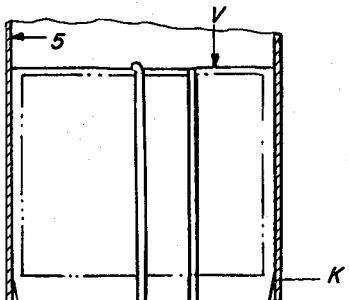
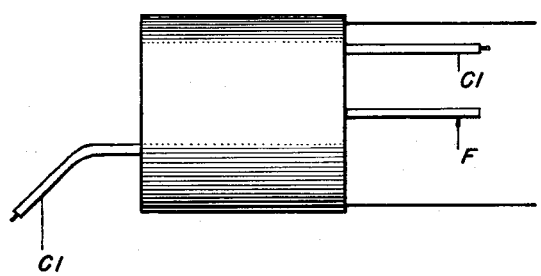
Fig. 11.
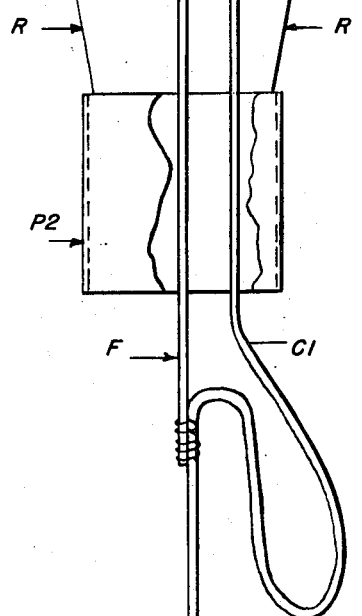
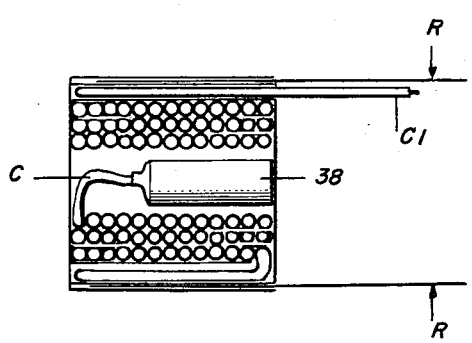
Fig. 12.
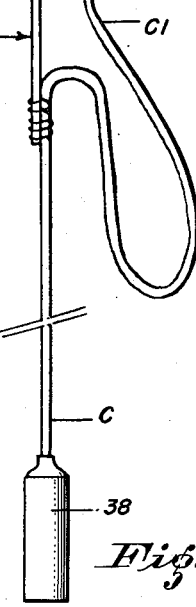
Fig. 13.
INVENTOR
Guy Maes
BY
Kenon, Palmer, Stewart & Estabrook
ATTORNEYS

United States Patent Office 3,132,322
Patented May 5, 1964

3,132,322
RADIOSONIC BUOYS
Guy Maes, Neuilly-sur-Seine, France, assignor to l'Electronique Appliquee, Paris, France
Filed Feb. 8, 1960, Ser. No. 7,283
Claims priority, application France Feb. 9, 1959
15 Claims. (Cl. 340—2)

The present invention concerns improvements in or relating to radiosonic buoys of the kind to be thrown overboard from ships and dropped from planes and wherein the electrical supply for sonic and radioelectric equipments therein is obtained from salt water activated batteries.

Strong mechanical resistance, easy and safe handling and storing, security of mechanical and electrical operativeness once afloat are highly desirable qualities for such buoys, and it is the object of the invention to so provide the said equipments that such qualities are ensured in their full interdependencies.

Such improvements will be fully described with reference to the accompanying drawings, wherein:

FIG. 1 shows a first complete assembly of a radiosonic buoy in a read-for-use condition;

FIG. 2 shows a modified battery supply equipment for such a buoy, the hydrophone and hydrophone cable being omitted;

FIGS. 5 to 13 show the details of the hydrophone and hydrophone cable mounting in the buoy, viz.—

FIGS. 5 to 10 show respective and successive steps of the making of the hydrophone cable coil for the buoy;

FIGS. 11 and 12 show, respectively, a side view of the coil prepared for insertion within the buoy and a cross-section view of the coil; and FIG. 13 shows an elevation view of the concerned part of the buoy equipment in operation once the buoy is afloat.

A radiosonic buoy must embody a radio transmitter (together with a sonic modulator therefor, receiving the sonic signals) housed in a water-tight casing which also serves as a float, and underwater equipment comprising salt water batteries and the hydrophone at the end of its cable, when the buoy is at sea; however, for handling facilities, such a buoy must also present a cylindrical housing of the shortest possible length, and further, in storing and handling conditions, the buoy must have all equipments, housed in a waterproof casing though such waterproofness must be automatically broken as soon as the buoy reaches the water. From another point of view, such a buoy may advantageously be capable of being, after due services at sea, taken back aboard and the exhausted parts thereof easily replaced without inconvenience and without disturbing the still useful and usable other parts thereof.

Figure 4:
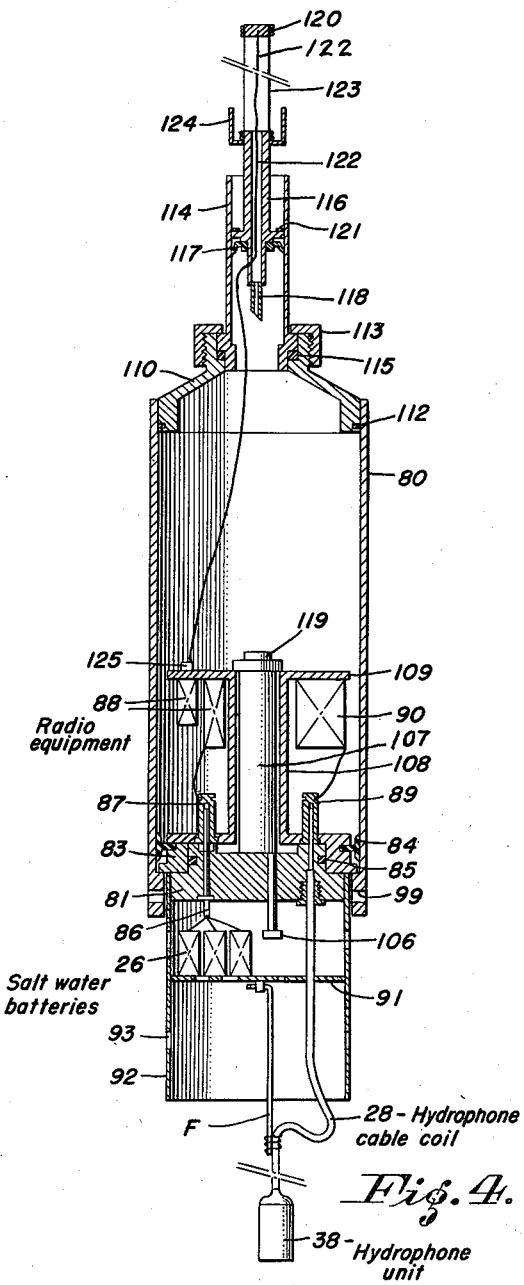
Figure 5:
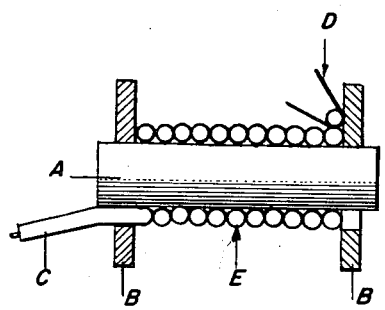

Referring to FIG. 1, the radio transmitter equipment, which may be similar to that shown at 88 and 90 in FIG. 4, has its location within the casing shown at 1. This equipment will not be detailed since it is of a conventional kind for such buoys. It is housed within a cylindrical casing which is not imperatively water-tight and is supported by an axial strut 41 between two base plates 15 and 11. The upper plate 15 is made with a sealed-through lead 18a for the passage of an aerial cable, said aerial being schematically indicated at 18. Such an aerial, not otherwise shown, may be understood as being of any suitable extendible kind, being normally retracted during the storing and handling conditions of the buoys. Around a reduced portion of the plate 15 is shown an annular water-tight joint 16. The lower plate 11 carries a coaxial plug member 13 and socket 12. Plug 13 will serve for carrying the sonic modulating signal to the radio transmitter and the sockets 12 will be plugged for the electrical supplies for the said transmitter from the batteries.

The radio sub-assembly part of FIG. 1 is intended to be housed in a half-casing 4, of cylindrical shape. This casing comprises at one end a ring 9 of plastic material and, at its other end, a further ring 6 and enclosing a water-tight plastic joint 7. The ring 6 protrudes downwardly from the tubular casing 4 and into the upper end of the lower half-casing 5. The lower plate 11 is press-fitted within the ring 6.

The second sub-assembly comprises two portions, a first portion which includes the salt water activable batteries and the second portion includes the hydrophone 38 and its cable coiled around it at 28 as will be later fully explained with reference to FIGS. 5 to 12. The end of the cable 28 passes within the battery compartment and is therein connected to a member of coaxial plug 21, mounted in a plate 19 also traversed by plugs 20 connected to the battery supply proper. The member 21 is intended to cooperate with the socket member 13 on plate 11, and the plugs 20 to cooperate with the sockets 12.

As shown in FIG. 1, for instance, the supply unit 22 proper is water-tight and its neck 24 presses a sealing joint member 23 between the said neck and the cylindrical wall 25 in plate 19. The base of the unit 22 supports a plate 26a upon which rest the salt water activable batteries 26.

Around the batteries is established a cylinder 27 open at both ends. A plate 39, with provision for the passage of the hydrophone cable 28 therethrough, by means of a water-tight plastic joint 29, closes the end of the cylinder 27 during storage periods for the purpose of excluding the atmosphere from the batteries insofar as this is possible. An annular joint 30 is provided around a reduced portion of the plate 19 within the ring 6.

As shown in FIG. 1, the equipment is mounted within the half-part cylindrical casing 5 which is open at both ends and is provided near its lower end with the two diametrically opposed holes 37.

The assembly of the arrangements of FIG. 1 is made by, firstly merely plugging-in the protruding members of plate 19 into the receiving members of plate 11 (the electrical connections are thus automatically made together with part of the mechanical connection). The joint 30 is a plastic joint and insures the water-tightness of the housing of the radio transmitter 1. Then, after completion of this first connection, the cylindrical casing 5 is affixed on the ring 6 thereby surrounding the batteries and hydrophone arrangements. On each side of the hydrophone arrangement are placed two struts 32 bearing at their upper end against plate 39 and at their lower ends on a bottom plate 33 pressed towards the top by a coil spring 34 itself supported by a transverse bar 35 which is locked by a locking member 36 within the holes 37 of the cylinder 5. In such condition, the spring 34 completes and maintains the water-tightness of the battery and hydrophone housing by its action on 33. Spring 34 presses the plate 33 upwardly and raises the plate 39 through its action on the struts 32, and raising of the plate 39 presses the upper end of the cylinder 27 into contact with the lower face of the plate 19.

When the buoy comes into contact with the sea water, the impact will unlock the member 35 and this member and the plate 33 will fall down, and the hydrophone cable will uncoil. The batteries are activated by sea water and the buoy is ready for due operation. The details of the latch member 36 may be the same as for the arrangement shown in FIGURE 2, see the parts 73, 75 and 78.

The opening of the battery casing to salt water actually depends upon the lowering of the plate 39 once the hydrophone cable has uncoiled. It may be preferable to provide a positive action for such an opening and this is the purpose of the modification disclosed in FIG. 2 (wherein the hydrophone portion is omitted for the sake of clarity of the explanation).

In FIG. 2, the batteries 26 are distributed around the rod 60 supporting at its lower end a plate 61 on which rest the batteries and affixed at its upper end into the plate 62 (corresponding to the plate 19 of FIG. 1). Sealed-through leads 63 for the electrical connections pass through the plate 62. A cylinder or casing 64 surrounds the batteries and is supported by means of struts 65 screwed into plate 62 at their upper ends. A plastic joint 66 insures the tightness at the upper part of the cylinder when it is pressed against the wall 62 by spring 76 mounted below the cylinder 64, as explained below. A pair of springs 67 coiled around the struts and bearing against fins 68 of the cylinder 64 normally tend to move the cylinder 64 away from the plastic ring 66. A bottom plate 69, for which the struts 65 act as guide members, is permanently pressed towards the bottom by springs 70 surrounding struts 65 and bearing on fins 77 of the said cylinder 64. Springs 67 and 70 tend to hold the cylinder 64 spaced from the wall 62 and plate 69 when the spring 76 has been released.

The plate 62 is mounted within a cylinder or casing 71 (either one of the outer parts or a separate one, with respect to the preceding figures); and this cylinder is provided with a bar 72 locked by a locking member 73 with respect to diametrally opposed holes 74 in the bottom portion of 71. For instance, the portion 78 of the locking member 73 is hooked in one opening 74 and retracts under the action of a spring 75 when an impact of upward direction is applied to it. Between the member 72 and the bottom plate 69 is inserted a coiled spring 76, which presses upwardly against the plate 69 and presses the upper end of the cylinder 64 against the plastic ring 66 so long as the bar 72 is in latched position.

When the impact on the sea level occurs, latch 73 releases and all parts 72, 76, 78, 73, 75, fall down and out of casing 71 and consequently the springs 67 and 70 produce a positive opening of the chamber of the batteries as shown in FIG. 2. When the bar 72 and the spring 76 drop out of the casing 71, the plate 61 moves downwardly and rests upon the shoulders of the enlarged ends of the struts 65, thus allowing cylinder 64 to move away from the wall 62, and the springs 70 also operate to hold the lower end of cylinder 64 spaced away from plate 69. Of course, this arrangement may be used with the arrangement of FIG. 1 since the difference lies in the interposition of the hydrophone unit between plate 69 and coil 76 in FIG. 2.

Cylinder 71 may be the same as cylinder 5 in FIG. 1.

Figure 6:
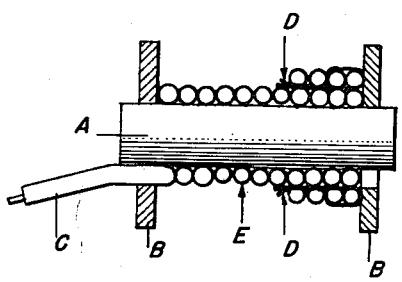
Figure 7:
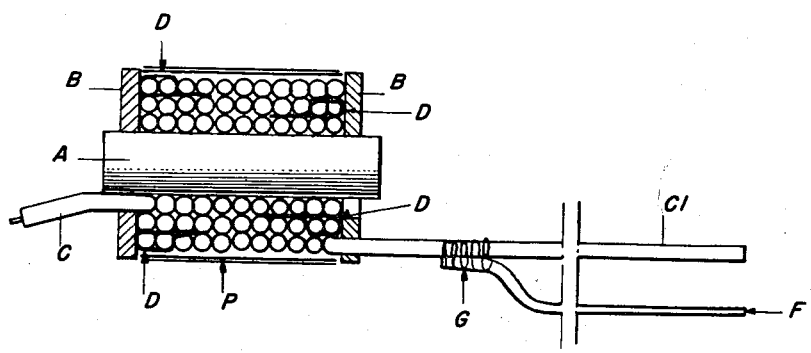
Figure 8:
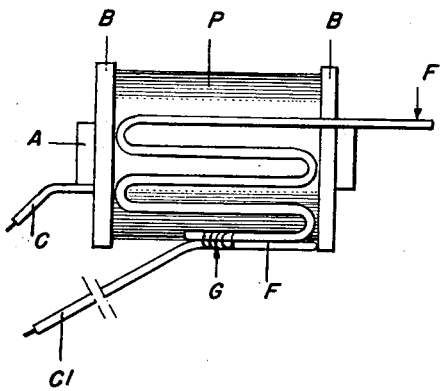
Figure 9:
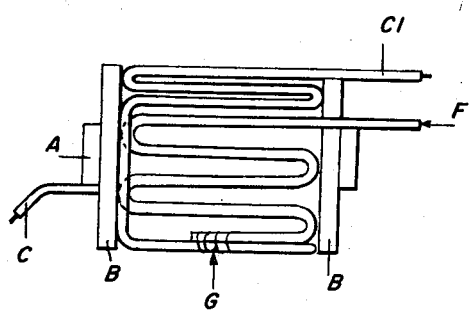

For duly coiling the hydrophone cable and enabling the suitable uncoil of this cable solely under the weight of the hydrophone, as well as obtaining a coil of suitable cable length within a restricted available volume, it and the transmitter casing or supporting member are provided to act as follows, with reference to FIGS. 5 to 12:

For obtaining the required tubular coil, use is temporarily made of a mandrel A, FIGS. 5 to 10, and two disks B mounted on the ends of this mandrel A to fix the useful length of the coil. A small length of cable C being left available, a first layer of cable is coiled, at E, FIG. 5, by spiralling the cable around the mandrel with contiguous turns, from one disk B to the opposite one. Between the layer thus formed and the layer which is to be superposed thereon is interposed a short length of some ribbons such as shown at D, uniformly distributed about the periphery of the cylindrical surface of the layer. The coil is continued in the opposite direction so that, as shown in FIG. 6, the ribbons are applied over the beginning turns of the spiral in formation. This process is repeated at each end of the coil during its formation, from layer to layer, which finally gives the unit of FIG. 7. The number of layers is chosen odd. Over the coil is wrapped a paper ribbon P, two turns at least, tightly wrapped around the coil, and on the cable end C1 issuing from the coil is fastened at G a flexible cord length F. Thereafter, FIG. 8, this flexible string F is itself formed into a flat coil applied over the wrapping paper P together with the part C1 of the cable, see FIG. 9 in this respect. A further wrapping of paper is made at P1, FIG. 10. Then the disks B are removed and the mandrel A also, FIG. 11. Finally, FIG. 12, the hydrophone 38 is connected to the inner end C of the cable and housed at the place of the mandrel as shown in said FIG. 12.

When the buoy impacts or strikes the sea level as said, the hydrophone cable is loosened and uncoils under the action of the hydrophone acting as a weight. The flexible string F then serves to avoid pulling the cable from its support at V within the buoy housing. Ribbons such as R may be used for sustaining the wrapping P2 (as a whole) during the uncoiling of the cable, such ribbons being affixed at K on the said cylinder 5.

Figure 3:
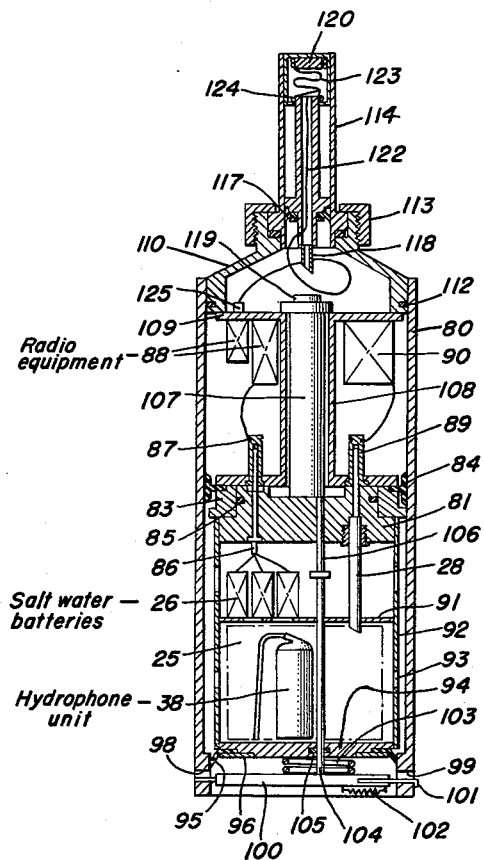
FIGS. 3 and 4 are respective views in storing and operative conditions, showing a modification of assembly of the equipments of the buoy with respect to the arrangement of FIG. 1.

In order to further reduce the volume of the buoy during storing and handling periods, whilst insuring to the said buoy a water-tight air volume suitable for insuring proper floating thereof when at sea, it is further provided a modification, shown in FIGS. 3 and 4, of the assembly between the sonic, supply and radio equipments thereof and the tubular external housing defining this actual height. More definitely, in this respect, it is provided according to a further feature of the invention, to have the volume of the equipment housing of water-tight character reduced during the handling and storing periods and, on the other hand, automatically extended to a volume adapted to the proper floating of the buoy, once at sea.

Referring to FIGS. 3 and 4, the housing or casing of the buoy is shown at 80 and contains a piston 81 on the upper side of which is mounted a plate 83 carrying an annular joint 84 bearing against the internal wall of 80, thus insuring the water-tightness of the volume above its level whatever the position it occupies within the housing 80. Water-tightness joints 85 are further inserted between the piston 81 and the plate 83.

Two water-tight electrical connections are provided at least in the piston 81, one only of these being shown at 86 for insuring the electrical connection of the salt water battery supply to one or more terminals such as 87 and 89 above the plate 83, for the supply of the radio-electrical equipment 88; the other one 89 for connecting the hydrophone cable 28 to the sonic equipment 90.

The batteries 26 are mounted on a wall 91 in a sleeve or casing 92 supported from the piston 81. The sleeve 92 is perforated by holes such as shown at 93. During storing and handling periods, the sleeve 92 is closed at its lower end by a plate 94, FIG. 3, on the edge of which is set an annular water-tight joint 95 applied for instance by means of a ring 96.

In the open lower part of the tubular housing 80 are provided opposite holes 98 and 99 receiving respectively the end of a transverse bar 100 and the hooked end of a locking member 101 pressed to retract by a spring 102 but retained by the insertion of said hooked end in the hole 99. A coiled spring 103 is inserted between the member 100 and a bottom plate 94 thus maintaining the bar 100 applied in its locked condition and the plate 94 in its closing condition.

On the member 100 bears a rod 104 passing through a water-tight joint through the plate 94, as shown at 105, and further passing through the plate 91 supporting the batteries 26. This rod 104 abuts the end of a further rod 106 passing through the piston 81 and capable of sliding therethrough. In the rest position, rod 106 has its upper end on level with the upper face of piston 81 over which rests the bottom of a container 107 containing a gaseous fluid under pressure. This container is guided and maintained by a cylindrical portion of the wall 108, said portion 108 ending in a radial wall 109 under which are supported the radio and sonic equipments 88 and 90.

A lid 110 is affixed to the upper end of the housing 80, a plastic ring joint 112 insuring the tightness of this part of the housing.

At the bottom of the lower casing is placed the hydrophone 38 and its cable coil 25 according to the above-described structure.

On top of the lid 110 is connected by a coupling 113 a sleeve 114 pressing a plastic joint 115. Within this sleeve 114 is placed a tube 116 provided with a plastic joint 117 at its lower end which ends in a diaphragm-cutter 118 above the diaphragm 119 of the container 107. A cap 120 closes the sleeve 114 with the interposition of a ring plastic joint 121.

Between the tube 116 and the cap is shown an aerial structure which, if required, may be of advantage with such an arrangement of buoy though by no means imperatively used in connection therewith. This aerial comprises a tubular flexible sheath 123 of such an impervious plastic material as the one known under the commercial name of "rilsan" or the like and within this sheath is arranged a conducting flexible wire 122. The sheath 123 is attached to the end of the tube 116 by a wire coil 124 and the conductor is connected to the cap 120 and to a terminal 125 of the radioelectric equipment.

Sheath and wire are folded in the rest condition, FIG. 3. In said rest condition also, plate 109 abuts against the lid 110. The compactness of the arrangement is obvious and, if all members remain in such condition, the buoy will not float as the housing 80 does not contain a sufficient volume of gas. The length of this housing is of a value just enabling all members to be placed in the rest condition of FIG. 3.

When the buoy impacts the sea, the bar member 100 is pressed upwards, the locking member 101 escapes the hole 99, and all the members 100, 101, 103, 94, 95 fall down. But simultaneously, the rod 104 and consequently the rod 106 have been suddenly and temporarily moved upwards. The rod 106 moves the diaphragm 119 of the container 109 upon the cutter 118 to puncture the diaphragm and the gas under pressure from the container expands to lower the piston 81 to the position as shown in FIG. 4, and the aerial is simultaneously erected. The water-tightness of the part of the equipments under the piston 81 is broken and the batteries are activated from their contact with salt water; the hydrophone cable uncoils as previously described. The increase of volume of the gas-filled part of the buoy insures its floating.

It must be noted that the radio and sonic equipments are made integral with the piston 81 in order that, in the down position of said piston, the center of gravity of the buoy is suitably lowered and consequently the buoy has a greater stability in this respect.

Of course, the aerial may not be of the gas erectable kind, the action of the gas being preserved for the actuation of the piston and the equipments carried thereby.

I claim:

1. A radiosonic buoy comprising the combination of a tubular casing, means on the upper part of said tubular casing providing a watertight closure, a first supporting member within the upper portion of said casing, radio equipment watertightly carried by said first supporting member, a second supporting member disposed beneath the said first supporting member, salt water activatable batteries mounted on said second supporting member, a third supporting member disposed beneath the said second supporting member and within the lower portion of said tubular casing, a hydrophone and cable carried by said third supporting member, first means within said tubular casing for rendering the said second supporting member temporarily watertight, and second means carried by said tubular casing for automatically destroying watertightness and for enabling said hydrophone cable to uncoil freely upon impact of said buoy with the sea.

2. A radiosonic buoy according to claim 1, wherein the first said means comprises a cylindrical casing, a base plate closing said cylindrical casing, a plastic joint disposed between said casing and plate, and a spring urging said plate upwardly, and wherein the second said means comprises a transverse bar supporting said spring, and a temporary locking member releasable upon impact with the sea.

3. A radiosonic buoy according to claim 2, further comprising a plate in the midportion of said tubular casing, said base plate for batteries closing said cylindrical casing being slidable in the lower part of said tubular casing, struts connected to said midportion plate and slidably carrying said battery base plate, and further spring means on said struts exerting a force on said base plate closing said cylindrical casing.

4. A radiosonic buoy according to claim 3 further comprising a central rod connected to said midportion plate for supporting the batteries, and a watertight joint between said base plate for batteries and said cylindrical casing releasable by said temporary locking member upon impact with the sea.

5. A radiosonic buoy according to claim 2, wherein said hydrophone cable is coiled in the form of a toroid surrounding the hydrophone before impact of the buoy with the sea.

6. A radiosonic buoy according to claim 5, further comprising short lengths of free ribbon interspersed between the upper and lower ends of the successive turns of the said cable coil, and a paper wrapping surrounding the outer cylindrical surface of the said cable coil.

7. A radiosonic buoy according to claim 6, further comprising a flexible cord having one end attached to the cable near the hydrophone, coiled over said cable coil of toroidal form, and having the other end of said cord attached to said buoy.

8. A radiosonic buoy according to claim 1, wherein the said tubular casing comprises an upper portion and a lower portion, and an annular ring member extending partially within each portion whereby the said portions are held together.

9. A radiosonic buoy according to claim 8, wherein the said second supporting member for batteries comprises a base plate, a cyclinder surrounding said batteries and resting on said base plate, and wherein the third supporting member for the hydrophone comprises a bottom plate urged upwardly by a spring, and spacing members between said plates whereby said batteries and hydrophone are supported within said tubular casing without being directly attached thereto.

10. A radiosonic buoy according to claim 1, wherein said first supporting member comprises a watertight base plate, and said second supporting member comprises a watertight top plate, and sealed electrical connectors of the socket and plug type extending through both of said plates.

11. A radiosonic buoy according to claim 1, wherein the third supporting member for the hydrophone comprises a tubular casing disposed in the lower portion of the first said tubular casing.

12. A radiosonic buoy according to claim 1, wherein the second and third supporting members comprises a cylindrical casing, a base plate for supporting the hydrophone, a plate within said cylindrical casing for supporting the said batteries; and an annular member connected to said cylindrical casing and slidably carried within said tubular casing, a watertight joint between said annular member and said tubular casing, and means connected to said annular ring for driving said cylinder downward upon impact with the sea to increase the volume of said buoy.

13. A radiosonic buoy according to claim 12 wherein the said means comprises a pressurized gas container resting on a separable rod and carried by said annular ring, a diaphragm closure for said container on the top thereof, a cutter connected to said tubular casing watertight closure above said diaphragm whereby, upon impact with the sea, the diaphragm is carried into contact with the cutter and is punctured.

14. A radiosonic buoy according to claim 13, further comprising an aerial mounted on the said tubular casing watertight closure and being extensible by gas pressure released from said container.

15. A radiosonic buoy according to claim 12, wherein the said cylindrical casing enclosing the batteries is perforated, and wherein the third supporting member for the hydrophone comprises a bottom plate urged upwardly by a spring, and a plastic joint between said tubular casing and said spring urged base plate supporting the hydrophone.

References Cited in the file of this patent
UNITED STATES PATENTS

| | | |
|---|---|---|
| 2,310,017 | Canon et al. | Feb. 2, 1943 |
| 2,497,852 | Arenstein | Feb. 21, 1950 |
| 2,555,867 | Bennett | June 5, 1951 |
| 2,593,432 | Freas | Apr. 22, 1952 |
| 2,629,083 | Mason et al. | Feb 17, 1953 |
| 2,758,203 | Harris | Aug. 7, 1956 |
| 2,839,920 | MacAnespie | June 24, 1958 |
| 2,911,658 | Stanley | Nov. 10, 1959 |
| 2,978,668 | Kurie et al. | Apr. 4, 1961 |
| 3,006,002 | Pingree et al. | Oct. 31, 1961 |